(12) United States Patent
Wozniak et al.

(10) Patent No.: US 10,574,955 B2
(45) Date of Patent: Feb. 25, 2020

(54) RE-PROJECTING FLAT PROJECTIONS OF PICTURES OF PANORAMIC VIDEO FOR RENDERING BY APPLICATION

(71) Applicant: Microsoft Technology Licensing, LLC, Redmond, WA (US)

(72) Inventors: Matthew Wozniak, Bellevue, WA (US); Bakkama Srinath Reddy, Redmond, WA (US); Vladislav Alexandrov, Redmond, WA (US); David H. Mebane, Seattle, WA (US); Dibyajyoti Roy, Issaquah, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/269,230

(22) Filed: Feb. 6, 2019

(65) Prior Publication Data
US 2019/0246084 A1 Aug. 8, 2019

Related U.S. Application Data

(63) Continuation of application No. 15/384,265, filed on Dec. 19, 2016, now Pat. No. 10,244,215.

(60) Provisional application No. 62/427,156, filed on Nov. 29, 2016.

(51) Int. Cl.
| | |
|---|---|
| *H04N 19/597* | (2014.01) |
| *H04N 9/31* | (2006.01) |
| *G06T 3/00* | (2006.01) |
| *H04N 19/85* | (2014.01) |
| *H04N 19/44* | (2014.01) |
| *H04N 9/64* | (2006.01) |
| *H04N 9/67* | (2006.01) |

(52) U.S. Cl.
CPC ......... *H04N 9/3185* (2013.01); *G06T 3/0043* (2013.01); *H04N 9/646* (2013.01); *H04N 19/44* (2014.11); *H04N 19/597* (2014.11); *H04N 19/85* (2014.11); *H04N 9/67* (2013.01)

(58) Field of Classification Search
CPC ...................................................... H04N 5/225
USPC ....................................................... 348/36, 39
See application file for complete search history.

(56) References Cited

U.S. PATENT DOCUMENTS 8,145,007 B2 * 3/2012 Davey ................ G06K 9/00771
348/143

\* cited by examiner

*Primary Examiner* — Anand S Rao
(74) *Attorney, Agent, or Firm* — Klarquist Sparkman, LLP

(57) ABSTRACT

Innovations in reconstruction and rendering of panoramic video are described. For example, a view-dependent operation controller of a panoramic video playback system receives an indication of a view direction for an application and, based at least in part on the view direction, identifies a section of a picture of panoramic video in an input projection. The view-dependent operation controller limits operations of a color converter, video decoder, and/or streaming controller to the identified section. In this way, the panoramic video playback system can avoid performing operations to reconstruct sections of the picture of panoramic video that will not be viewed. As another example, a mapper of a panoramic video playback system re-projects at least some sample values in an input flat projection towards a center location for a view direction, producing an output flat projection, which an application can use to generate one or more screen projections.

20 Claims, 11 Drawing Sheets spherical projection 301 equirectangular projection 302 cubemap projection 303 input equirectangular projection 520 spherical projection 510
with first view section 511 input equirectangular projection 520 spherical projection 510 with
second view section 512

FIG. 12

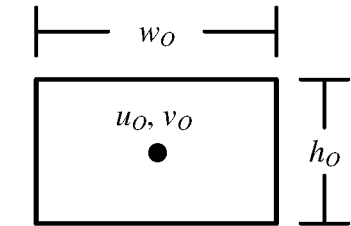

output equirectangular projection 1210

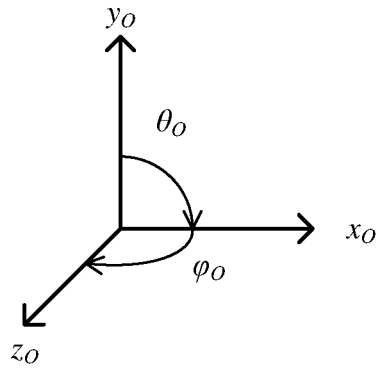

For each location $u_O, v_O$:

$u_O, v_O$

⇩ re-normalization of equirectangular coordinates $\vec{P}_O$

⇩ conversion to spherical coordinates $\vec{S}_O$

⇩ conversion to Cartesian coordinates $\vec{C}_O$

⇩ rotation $\vec{C}_I$

⇩ conversion to spherical coordinates $\vec{S}_I$

⇩ conversion to equirectangular coordinates $u_I, v_I$

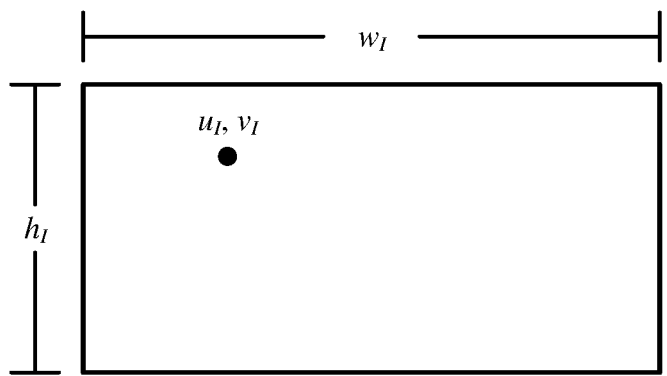

input equirectangular projection 1290

RE-PROJECTING FLAT PROJECTIONS OF PICTURES OF PANORAMIC VIDEO FOR RENDERING BY APPLICATION

CROSS REFERENCE TO RELATED APPLICATIONS

This application is a continuation of U.S. patent application Ser. No. 15/384,265, filed Dec. 19, 2016, which claims the benefit of U.S. Provisional Patent Application No. 62/427,156, filed Nov. 29, 2016, the disclosures of which are hereby incorporated by reference.

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices. Digital video is also used for technologies such as virtual reality and augmented reality, whether video is played back in a head-mounted display, mobile device, or other type of device.

Panoramic video is video in which views in multiple directions around a central position are recorded at the same time. The recorded video can include image content in every direction, or at least image content in every direction in a 360-degree sphere around the central position, including at least some image content above the central position and at least some image content underneath the central position. Panoramic video is sometimes called 360-degree video, immersive video, or spherical video. Panoramic video can be captured using an omnidirectional camera or a collection of multiple cameras pointing in different directions. For modern-day applications, panoramic video is processed in digital form during stages of creation, editing, and delivery, as well as stages of reconstruction and rendering for playback.

During playback, a viewer typically can control a view direction relative to the central position, potentially changing which section of the panoramic video is viewed over time. In some systems, a viewer can also zoom in or zoom out, which effectively changes the field of view of the panoramic video. When panoramic video is rendered for display, the section of the panoramic video that is viewed may be projected to a flat image, which is called a screen projection. For a mobile device or computer monitor, a single screen projection may be rendered. For a head-mounted display (or mobile device held in a head-mounted band), the section of the panoramic video that is viewed may be projected to two screen projections, for the left and right eyes, respectively.

When a computer system reconstructs and renders panoramic video, resources may be wasted reconstructing image content that is not viewed. For example, memory may be used to store sample values for areas of the panoramic video that are not viewed, and processing cycles may be used to determine the non-viewed sample values and their locations at different stages of processing.

SUMMARY

In summary, the detailed description presents innovations in reconstruction and rendering of panoramic video. In some example implementations, the innovations help a panoramic video playback system avoid spending resources such as memory and processing cycles to reconstruct image content that is not viewed. Alternatively, the innovations help a panoramic video playback system devote available resources to improving the quality of image content that is rendered.

According to one aspect of the innovations described herein, a computer system implements a panoramic video playback system that includes a streaming controller, an input buffer, a video decoder, a color converter, a mapper, and a view-dependent operation controller. The streaming controller is configured to request encoded data for at least one section of a picture of panoramic video in an input projection. The input projection can be, for example, an equirectangular projection or cubemap projection. The input buffer is configured to store the encoded data, and the video decoder is configured to decode at least some of the encoded data, thereby producing sample values of the at least one section of the picture of panoramic video in the input projection. The color converter is configured to convert at least some of the sample values produced by the video decoder from a first color space to a second color space. The mapper is configured to map at least some of the color-converted sample values to an output projection. The output projection can be a screen projection, in which case an application can simply use the screen projection for rendering. Or, the output projection can be an equirectangular projection or cubemap projection, in which case an application can perform further mapping operations on the output projection before rendering.

The view-dependent operation controller is configured to receive an indication of a view direction for an application and, based at least in part on the view direction, identify a section of the picture of panoramic video in the input projection. The view-dependent operation controller limits operations of the color converter to the identified section. In other words, color conversion operations are performed for sample values in the identified section, but not for sample values outside the identified section. In some example implementations, the view-dependent operation controller also limits operations of the video decoder, so as to selectively decode encoded data for the identified section but not other sections of the picture of panoramic video in the input projection. In still other example implementations, the view-dependent operation controller further limits operations of the streaming controller, so that the streaming controller requests encoded data for the identified section but not other sections of the picture of panoramic video in the input projection. In this way, the panoramic video playback system can avoid performing operations to reconstruct sections of the picture of panoramic video that will not be viewed.

According to another aspect of the innovations described herein, a computer system implements a panoramic video playback system that includes a streaming controller, an input buffer, a video decoder, and a mapper. The streaming controller is configured to request encoded data for at least one section of a picture of panoramic video in an input flat projection. The input flat projection can be, for example, an equirectangular projection or cubemap projection. The input buffer is configured to store the encoded data, and the video decoder is configured to decode at least some of the encoded data, thereby producing sample values of the at least one section of the picture of panoramic video in the input flat projection. The panoramic video playback system can also include a color converter that is configured to convert at least some of the sample values produced by the video decoder from a first color space to a second color space. The mapper is configured to map at least some of the sample values in the input flat projection to an output flat projection, which can be, for example, an equirectangular projection or cubemap projection. To map to the output flat projection, the mapper is configured to re-project the at least some of the sample values in the input flat projection (collectively) towards a center location for a view direction for an application. The application can perform further mapping operations on the output flat projection before rendering, for example, generating one or more screen projections from the output flat projection provided to the application. Compared to the input flat projection, the output flat projection can convey relevant details (such as sample values used to render a view) to the application in a more compact, efficient way, which may simplify later processing by the application.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 12 is a diagram illustrating features of an example implementation for re-projection of sample values of an input flat projection to an output flat projection in application rendering mode during playback of a picture of panoramic video.

DETAILED DESCRIPTION

The detailed description presents innovations in reconstruction and rendering of panoramic video. In some example implementations, the innovations help a panoramic video playback system avoid spending resources such as memory and processing cycles to reconstruct image content that is not viewed. Alternatively, the innovations help a panoramic video playback system devote available resources to improving the quality of image content that is rendered. The innovations include use of view-dependent operations such as color conversion operations and decoding operations during playback of panoramic video. The innovations also include re-projection between flat projections of pictures of panoramic video, to make later rendering by an application more efficient.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

Figure 1:
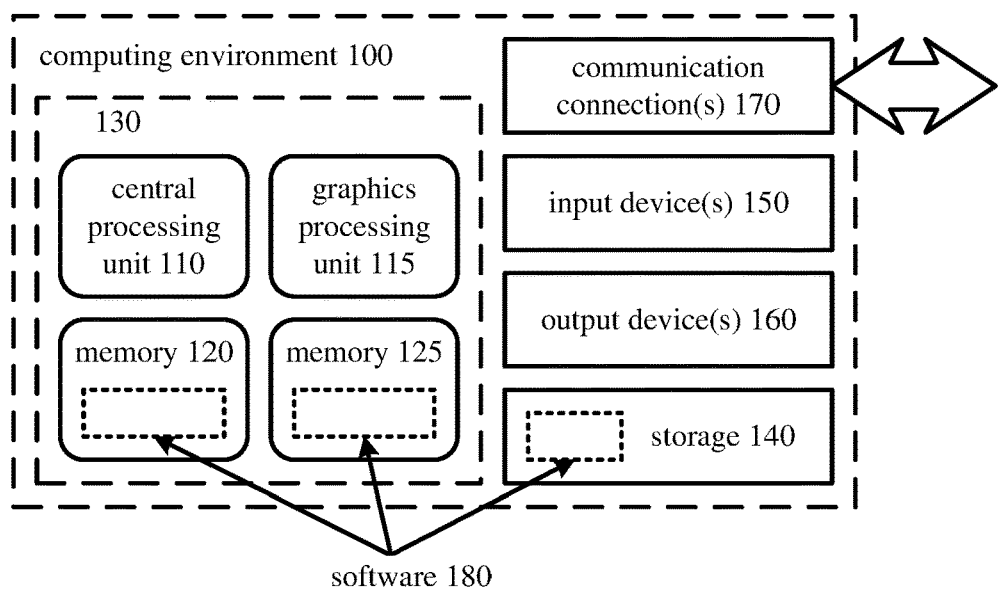
FIG. 1 is a diagram illustrating an example computer system in which some described embodiments can be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for view-dependent operations and/or re-projection between flat projections during playback of panoramic video, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for view-dependent operations and/or re-projection between flat projections during playback of panoramic video.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a head-mounted display, computer monitor, other display device, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine," "select," and "receive" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
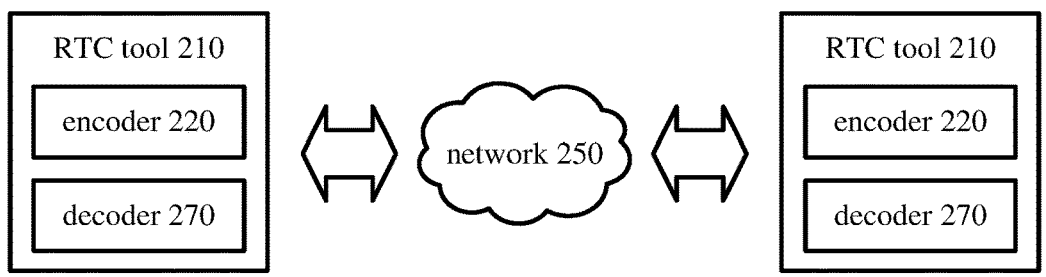
FIGS. 2a and 2b are diagrams illustrating example network environments in which some described embodiments can be implemented.
Figure 2B:
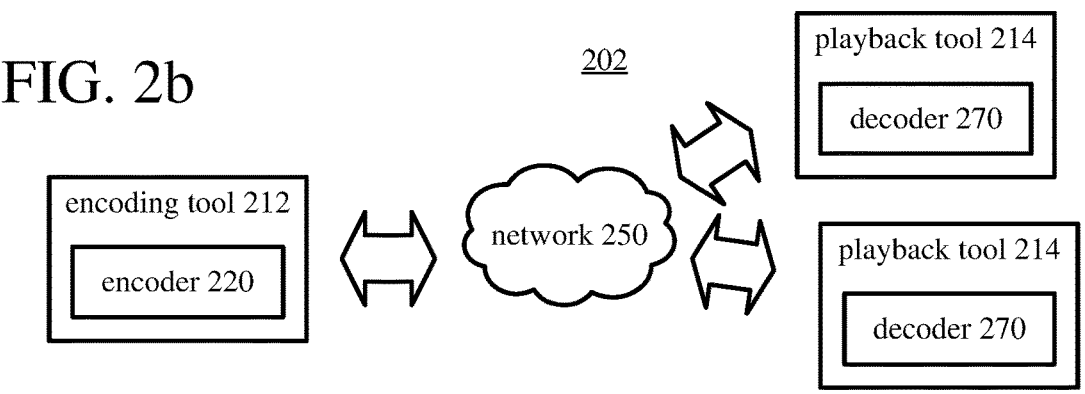

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the H.265/HEVC standard, ISO/IEC 14496-10 standard (also known as H.264/AVC), another standard, or a proprietary format such as VP8 or VP9, or a variation or extension thereof, with a corresponding decoder (270) accepting and decoding encoded data from the encoder (220). The bidirectional communication can be part of a video conference, video telephone call, or other two-party or multi-party communication scenario. Although the network environment (201) in FIG. 2a includes two RTC tools (210), the network environment (201) can instead include three or more RTC tools (210) that participate in multi-party communication.

Figure 6:
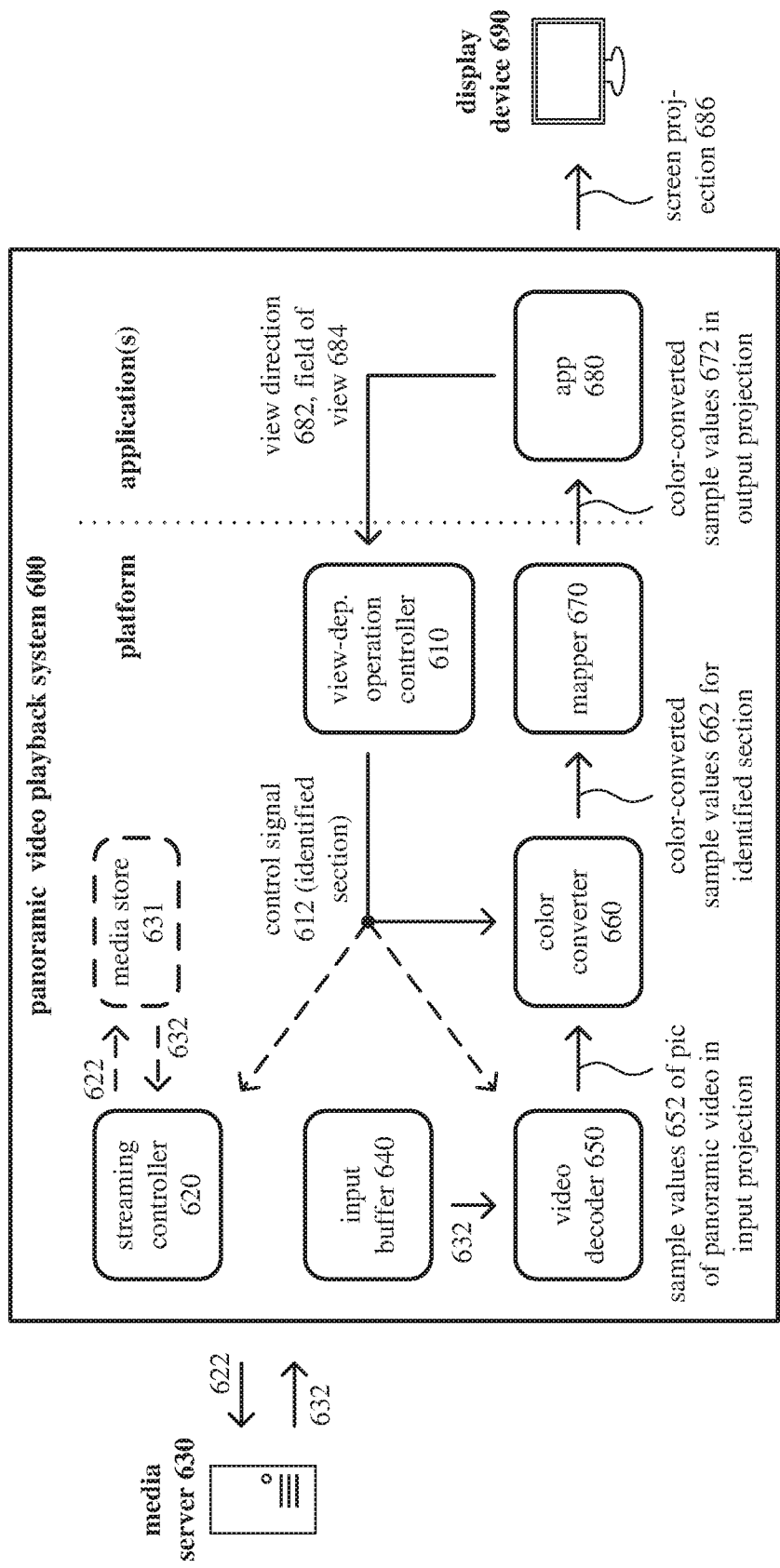
FIG. 6 is a diagram illustrating an example architecture for a panoramic video playback system that supports view-dependent operations and re-projection operations for flat projections.
Figure 10:
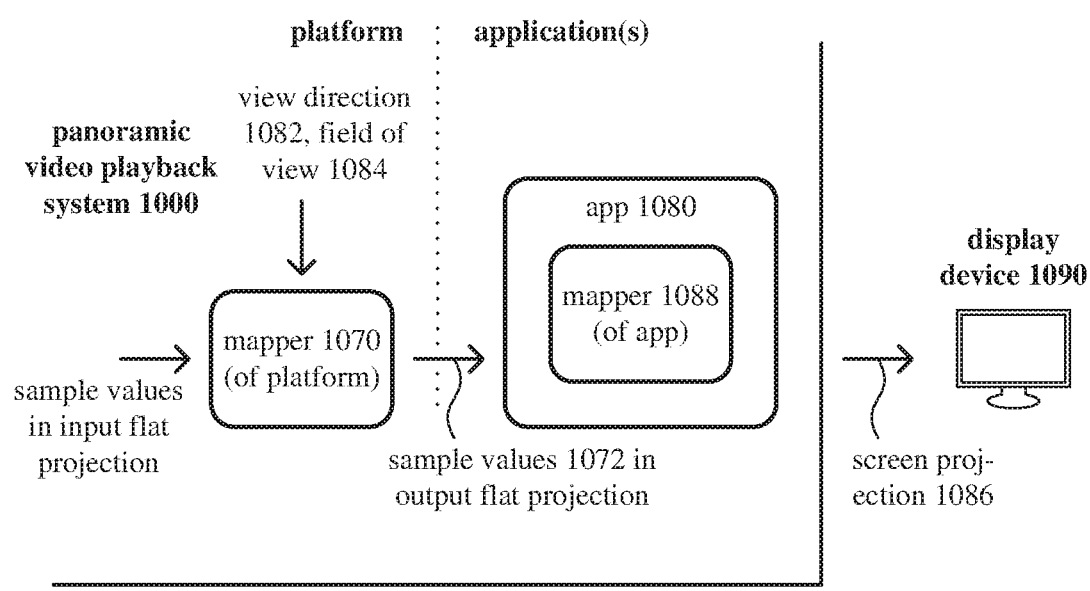
FIG. 10 is a diagram illustrating features of an example architecture for a panoramic video playback system that operates in application rendering mode.

An RTC tool (210) manages encoding by an encoder (220) and also manages decoding by a decoder (270). FIGS. 6 and 10 show example video playback systems (600, 1000) that can be included in the RTC tool (210). Alternatively, the RTC tool (210) uses another video playback system.

In the network environment (202) shown in FIG. 2b, an encoding tool (212) includes an encoder (220) that encodes video for delivery to multiple playback tools (214), which include decoders (270). The unidirectional communication can be provided for live broadcast video streaming, a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can include server-side controller logic for managing connections with one or more playback tools (214). A playback tool (214) can include client-side controller logic for managing connections with the encoding tool (212). FIGS. 6 and 10 show example video playback systems (600, 1000) that can be included in the playback tool (214). Alternatively, the playback tool (214) uses another video playback system.

Alternatively, a Web server or other media server can store encoded video for delivery to one or more playback tools (214), which include decoders (270). The encoded video can be provided, for example, for on-demand video streaming, broadcast, or another scenario in which encoded video is sent from one location to one or more other locations. A playback tool (214) can communicate with the media server to determine a stream of video for the playback tool (214) to receive. The media server can include server-side controller logic for managing connections with one or more playback tools (214). A playback tool (214) receives the stream, buffers the received encoded data for an appropriate period, and begins decoding and playback.

III. Example Projections for a Picture of Panoramic Video.

Panoramic video (sometimes called 360-degree video, immersive video, or spherical video) is video in which views in multiple directions around a central position are recorded at the same time. A picture of panoramic video is a representation of the views in multiple directions recorded at a given time. The picture of panoramic video can include image content in every direction or substantially every direction from the central position. More commonly, a picture of panoramic video includes image content in every direction in a 360-degree sphere around the central position, including at least some image content above the central position and at least some image content underneath the central view/camera position.

A picture of panoramic video includes sample values, which represent colors at locations of the picture. Depending on how the picture is projected, sample values of the picture can have various attributes. In general, sample values can have 8 bits per sample value, 10 bits per sample value, 12 bits per sample value, or some other number of bits per sample value. The dynamic range of sample values can be standard dynamic range (e.g., 0 to 100 nits), high dynamic range (e.g., 0 nits to 1000 nits, 0 nits to 1500 nits, 0 nits to 4000 nits), or some other dynamic range. With respect to color gamut, the sample values can have a narrow color gamut (common for standard dynamic range video) or a wider color gamut (common for high dynamic range video), which can potentially represent colors that are more saturated, or vivid. For a rectilinear projection, the spatial resolution of a picture of panoramic video can be 2160× 1080 sample values, 4320×2160 sample values, 7680×3840 sample values, 8640×4320 sample values, or some other number of sample values per picture. Often, the spatial resolution of a picture of panoramic video is very high (e.g., 8K or higher), so as to provide sufficient spatial resolution when a smaller view within the picture is rendered. In general, a pixel is the set of one or more collocated sample values for a location in a picture, which may be arranged in different ways for different chroma sampling formats. For a spherical projection, spatial resolution can vary.

Typically, before encoding in a rectilinear projection (e.g., an equirectangular projection), sample values of a picture are converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RG-B) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YIN 4:2:0 format) in order to reduce the spatial resolution of chroma sample values, or the chroma sample values may have the same resolution as the luma sample values (e.g., for a YIN 4:4:4 format). After decoding, sample values in a rectilinear projection may be converted to another color space, such as an RGB color space. Sample values in a spherical projection or screen projection for a picture of panoramic video may be in an RGB color space or other color space.

Figure 3A:
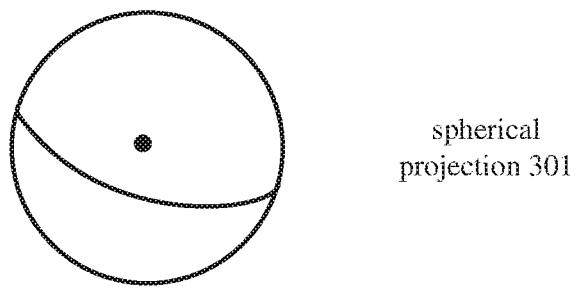
FIGS. 3a to 3c are diagrams of example projections for a picture of panoramic video.

The image content for a picture of panoramic video can be organized in various ways. FIG. 3a shows a spherical projection (301) for a picture of panoramic video. In the spherical projection (301), sample values are mapped to locations equally distant from a central view/camera position. Sample values may be in an RGB color space or other color space close to the final color space for rendering. The spherical projection (301) provides a conceptually simple way to represent the sample values of the picture of panoramic video, and may be useful for some modeling and rendering operations. For other stages of processing (e.g., storage, compression, decompression), the spherical projection (301) may not be as efficient as other types of projections.

Figure 3B:
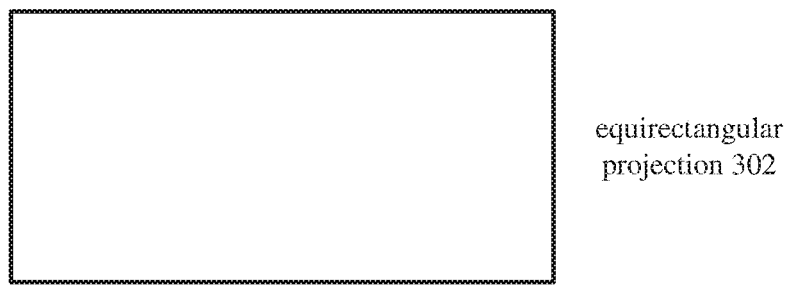

FIG. 3b shows an equirectangular projection (302) for a picture of panoramic video. The equirectangular projection (302) is a useful representation for storing, compressing, and decompressing sample values of the picture of panoramic video. In particular, sample values of the equirectangular projection (302) can be processed with conventional video coding/decoding tools, which process blocks of sample values in rectangular pictures. The equirectangular projection (302) depicts image content in 360 degrees, rotating sideways from a central view/camera position, along the horizontal axis; it depicts image content in 180 degrees, rotating up or down from a central view/camera position, along the vertical axis. In the equirectangular projection (302), content towards the top of the picture and content towards the bottom of the picture is stretched horizontally, and content midway between the top and bottom is squeezed horizontally. In addition to causing visible distortion (which is not a problem to the extent the equirectangular projection (302) is not directly rendered for display), the equirectangular projection (302) uses extra sample values to represent the content towards the top of the picture and content towards the bottom of the picture. Metadata associated with the equirectangular projection (302) can indicate resolution of the equirectangular projection (302) as well as a view direction at each of one or more locations of the equirectangular projection (302) (e.g., view direction at the center of the equirectangular projection (302), view direction at the midpoint of the vertical axis along an edge of the equirectangular projection (302)). Or, a default view direction for a location of the equirectangular projection (302) can be defined. For example, the center of the equirectangular projection (302) is defined to be the view direction with pan of zero degrees and pitch of zero degrees.

Figure 3C:
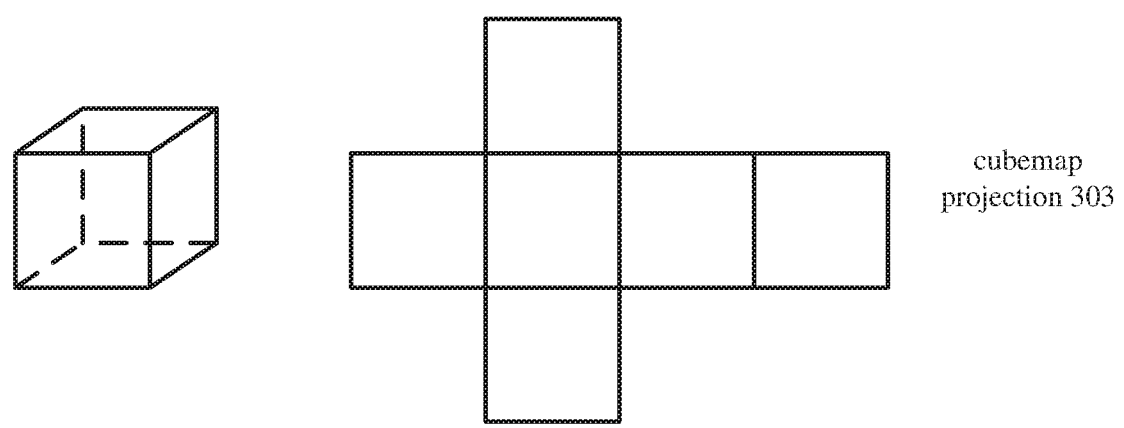

FIG. 3c shows a cubemap projection (303) for a picture of panoramic video. Like the equirectangular projection (302), the cubemap projection (303) is a useful representation for storing, compressing, and decompressing sample values of the picture of panoramic video, because the faces of the cubemap projection (303) can be "unfolded" and/or split into separate sections for such operations. In the cubemap projection (303), content towards the edges of faces of a cube is stretched horizontally and/or vertically, and content towards the middle of faces is squeezed horizontally and/or vertically. In general, the extent of such stretching is less than at the top and bottom of the equirectangular projection (302), and the cubemap projection (303) may use fewer extra sample values to represent stretched content. Metadata associated with the cubemap projection (303) can indicate resolution of the cubemap projection (303) as well as a view direction at each of one or more locations of the cubemap projection (303).

During playback, pictures of panoramic video are reconstructed. At least conceptually, a picture may be represented in spherical projection at this stage. Typically, a viewer can control a view direction relative to the central view/camera position for the spherical projection, potentially changing which section of the panoramic video is viewed. For example, in addition to specifying heading in degrees or radians from side to side (i.e., yaw, or pan) for a view direction, the viewer can specify an inclination in degrees or radians up or down (i.e., pitch, or tilt) for the view direction and even a rotation in degrees or radians of the view (i.e., roll) for the view direction. Alternatively, the view direction can be parameterized in some other way (e.g., as a matrix of affine transform coefficients that specify a spatial rotation in three dimensions using Euler angles or quaternion units, corresponding to heading, pitch, and roll values). The viewer may also be able to zoom in or zoom out, which effectively changes the field of view of the panoramic video as rendered. The field of view can be specified in degrees (e.g., 90 degrees for normal view, 120 degrees for wide view) or radians. When a view of panoramic video is rendered for display, the section of the panoramic video that is viewed may be projected to a flat image, which is called a screen projection.

Figure 4:
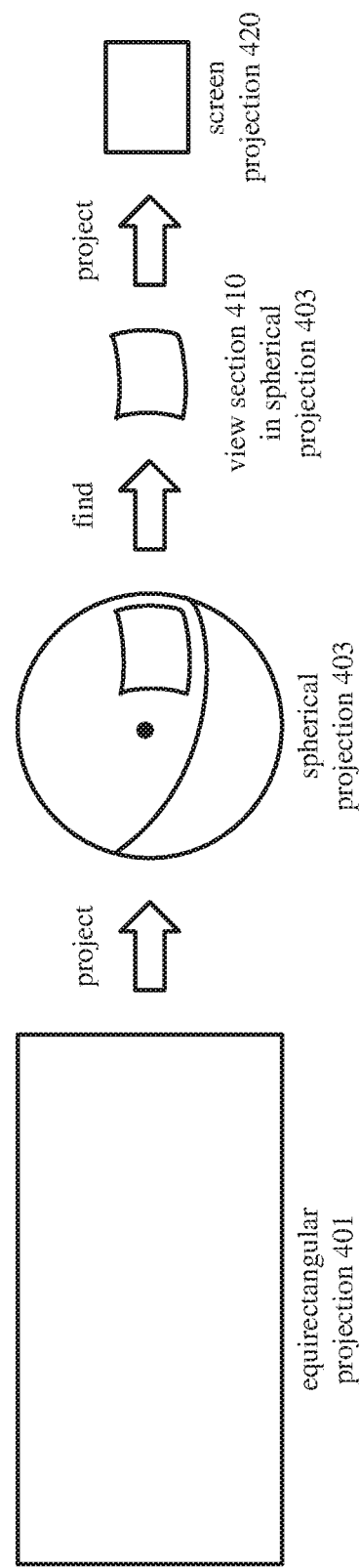
FIG. 4 is a diagram illustrating an example of a screen projection for a view of a picture of panoramic video.

FIG. 4 shows an example of screen projection for a view of a picture of panoramic video. An equirectangular projection (401) of the picture is reconstructed, e.g., through video decoding operations and color conversion operations. The sample values of the picture of panoramic video are mapped to the spherical projection (403). In essence, the sample values are projected to the "inside" of the sphere for the spherical projection (403), as viewed from the perspective of a view/camera position at the center of the sphere. Locations in the spherical projection (403) are mapped to corresponding locations in the equirectangular projection (401). If a corresponding location in the equirectangular projection (401) is at or near an integer (whole pixel) offset, the sample value from the corresponding location is assigned to the location in the spherical projection (403). Otherwise, a sample value can be calculated by interpolation between sample values at nearby locations in the equirectangular projection (401) (e.g., using bilinear interpolation), and the (interpolated) sample value is assigned to the location in the spherical projection (403).

A view section (410) in the spherical projection (403) is found, based on a view direction and field of view from the central view/camera position. The view section (410) is projected to a screen projection (420) for rendering. For example, a perspective transform is applied to assign sample values to the respective locations of the screen projection (420) from the sample values of the spherical projection (403). For every location of the screen projection (420), a sample value is assigned directly from the spherical projection (403) or from interpolation between sample values of the spherical projection (403). Thus, the screen projection (420) includes sample values from the spherical projection (403) and, by extension, sample values from relevant parts of the equirectangular projection (401).

IV. Examples of Identifying Sections in Input Projections.

When an application provides a view direction and field of view (if not pre-defined) for rendering a view of a picture of panoramic video, the application specifies a view section to be rendered. For example, an application provides an indication of a view direction (and possibly an indication of a field of view) to a module of a panoramic video playback system. The view direction can be specified as (1) a heading in degrees or radians from side to side (i.e., yaw, or pan) from a central view/camera position and (2) an inclination in degrees or radians up or down (i.e., pitch, or tilt) from the view/camera position. The view direction can also include (3) a rotation in degrees or radians of the view (i.e., roll) from the view/camera position. Or, the view direction can be parameterized in some other way (e.g., a matrix of affine transform coefficients that specify a spatial rotation). The field of view can be specified in degrees (e.g., 90 degrees for normal view, 120 degrees for wide view) or radians. Alternatively, instead of directly providing indications of view direction (and possibly field of view), an application can specify a source for indications of view direction (and possibly field of view), in which case the specified source provides the indications during rendering. In any case, the module of the panoramic video playback system finds the appropriate view section for a spherical projection of the picture of panoramic video.

The view section typically includes a small proportion of the overall content of the picture of panoramic video. To simplify processing and save resources during operations such as decoding and color conversion, the panoramic video playback system can identify the section of the picture, in an input projection, that corresponds to the view section, then use that information to limit which operations are performed when reconstructing the input projection for the picture of panoramic video. In particular, the panoramic video playback system can limit operations to the identified section in the input projection (and possibly neighboring areas around the identified section in the input projection).

Figure 5A:
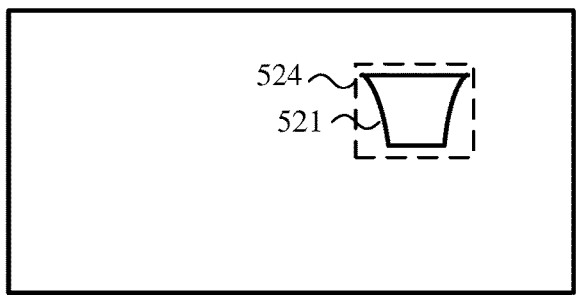
FIGS. 5a and 5b are diagrams illustrating examples of identification of sections of an input equirectangular projection that correspond to view sections of a spherical projection for a picture of panoramic video.
Figure 5A:
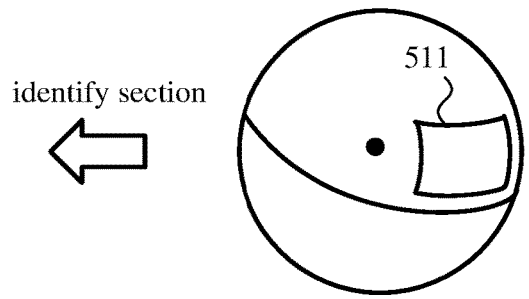

FIG. 5a shows an example of identification of a section of an input equirectangular projection (520) that corresponds to a first view section (511) of a spherical projection (510) for a picture of panoramic video. The panoramic video playback system finds the first view section (511) of the spherical projection (510) based on a view direction and field of view. Based on the first view section (511), the panoramic video playback system identifies a section in the input equirectangular projection (520). Specifically, the panoramic video playback system identifies a portion (521) of the picture in the equirectangular projection (520) that corresponds to the first view section (511) of the spherical projection (510).

Depending on the location of the view section in a spherical projection, due to stretching in the equirectangular projection at locations further away from the middle horizontal line and squeezing in the equirectangular projection at locations closer to the middle horizontal line, the corresponding portion in an equirectangular projection may be stretched and/or squeezed. In FIG. 5a, the corresponding portion (521) is stretched at the top of the corresponding portion (521) and squeezed towards the bottom of the corresponding portion (521). The panoramic video playback system sets a rectangular bounding box (524) around the corresponding portion (521) in the equirectangular projection (520). The identified section defined by the bounding box (524) can be used to limit operations such as color conversion operations and decoding operations when reconstructing the input equirectangular projection (520).

Thus, the identified section, which includes the corresponding portion (521) of the equirectangular projection (520) for the view direction and field of view, includes a buffer area around the corresponding portion (521). In this way, the identified section can be aligned with boundaries of groups of sample values (e.g., blocks, slices, tiles) for different operations in the reconstruction process. The buffer area also gives some room for movement, allowing rapid feedback and also providing for reconstruction of content that may be used for reference in later decoding operations if the view direction changes gradually. Also, if the view direction for the application is a predicted view direction (e.g., based on a rate of change in view direction or other pattern of a viewer), the buffer area provides "extra" reconstructed content of the equirectangular projection (520), for correction between the predicted view direction and an actual view direction later specified by a viewer.

Figure 5B:
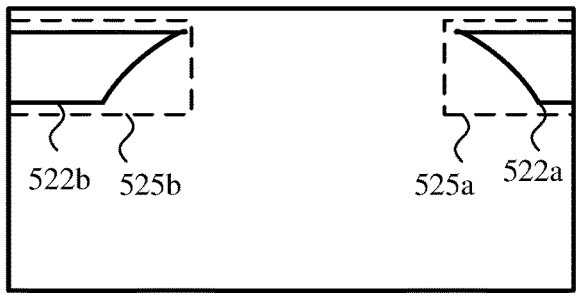
Figure 5B:
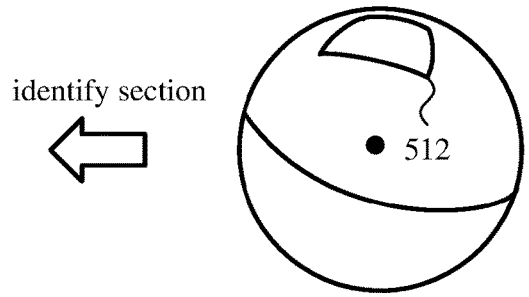

FIG. 5b shows an example of identification of a section of the input equirectangular projection (520) that corresponds to a second, different view section (512) of the spherical projection (510) for the picture of panoramic video. The panoramic video playback system finds the second view section (512) of the spherical projection (510) based on a view direction and field of view. Based on the second view section (512), the panoramic video playback system identifies a different section in the input equirectangular projection (520). Specifically, the panoramic video playback system identifies two portions (522a, 522b) of the picture in the equirectangular projection (520) that correspond to the second view section (512) of the spherical projection (510). The corresponding portions (522a, 522b) "wrap around" the picture in the equirectangular projection (520). In FIG. 5b, the corresponding portions (522a, 522b) are stretched extensively towards the top of the corresponding portions (522a, 522b). The panoramic video playback system sets rectangular bounding boxes (525a, 525b) around the corresponding portions (522a, 522b) in the equirectangular projection (520). The identified section defined by the bounding boxes (525a, 525b) can be used to limit operations such as color conversion operations and decoding operations when reconstructing the input equirectangular projection (520).

FIGS. 5a and 5b depict an input equirectangular projection. Alternatively, the input projection can be a cubemap projection. In a cubemap projection, depending on the location of a view section in a spherical projection, the section of the input cubemap projection that includes the corresponding portion (within a bounding box or bounding boxes can be found in a single face of the cube, two faces across an edge, three faces in a corner, or even more faces if the identified section is large enough.

V. Example Architectures for Rendering of Panoramic Video.

When a panoramic video playback system receives panoramic video, the panoramic video playback system renders views of the panoramic video. This section describes various aspects of example architectures for playing back panoramic video, including use of view-dependent operations and re-projection between flat projections. Example architectures described in this section support playback in platform rendering mode or in application rendering mode.

In some example implementations, in platform rendering mode, a module of the panoramic video playback system provides a screen projection to an application (e.g., to a buffer indicated by the application for rendering). The application can be a lightweight application that does not itself perform rendering operations for panoramic video, which simplifies implementation for the application. For example, the application is a news viewer, real estate site listing application, or other application that does not specialize in presentation of panoramic video. Instead, the application provides a view direction and may also provide a field of view, and the "platform" (system-provided modules of the panoramic video playback system) performs operations to generate a screen projection. Alternatively, the application can set a source for view direction and field of view (e.g., a source based on one or more sensors such as one or more accelerometers, gyroscopes, tilt sensors, optical sensors, cameras, etc., or a source of user input events for key presses, mouse cursor movements, mouse scroll wheel movements, remote control input, game controller input, touch screen input, etc.), and the platform gets the view direction and field of view information from that source. The application may also have an on/off control for rendering. In platform rendering mode, view-dependent operations may be used, but re-projection between flat projections is not used.

In some example implementations, in application rendering mode, a module of the panoramic video playback system provides a flat projection to an application. The flat projection can be an equirectangular projection or a cubemap projection. In application rendering mode, the application includes a module that performs additional transformations to the sample values of the flat projection (e.g., mapping to spherical projection, snapping to screen projection) so as to generate one or more screen projections appropriate for the application, which gives the application more control over rendering decisions. For example, the application is a virtual reality application, augmented reality application, or specialty media application for panoramic video. In application rendering mode, view-dependent operations may be used, and re-projection between flat projections may be used. Application rendering mode may be called frame server mode the "platform" (system-provided modules of the panoramic video playback system) extracts individual pictures (frames) and serves the pictures to the application on a picture-by-picture basis for playback. In application rendering mode, different applications can use different approaches to rendering of flat projections. For a mobile device or computer monitor, a single screen projection may be rendered. Or, for a head-mounted display (or mobile device held in a head-mounted band), an application may generate two screen projections, for the left and right eyes, respectively.

A. Example Rendering Architectures for Panoramic Video.

FIG. 6 shows an example architecture for a panoramic video playback system (600) that supports view-dependent operations and re-projection operations. In addition to a display device (690) and media server (630), the example architecture includes a panoramic video playback system (600) with a view-dependent operation controller (610), streaming controller (620), input buffer (640), video decoder (650), color converter (660), mapper (670), and application (680). The application (680) can be provided by a third party or packaged as part of the panoramic video playback system (600). The application (680) can separated from other modules of the panoramic video playback system (600) (system-provided modules) by an application programming interface ("API").

In the scenario shown in FIG. 6, the panoramic video playback system (600) limits operations of the color converter (660) to an identified section of an input projection for a picture of panoramic video. In other scenarios, the panoramic video playback system (600) limits operations of the video decoder (650) to an identified section of an input projection for a picture of panoramic video, in addition to limiting operations of the color converter (660). In still other scenarios, the panoramic video playback system (600) instructs the streaming controller (620) to limit the encoded data that is requested to be encoded data for an identified section of an input projection for a picture of panoramic video, in addition to limiting operations of the video decoder (650) and the color converter (660). These scenarios are further detailed below.

The display device (690) can be a head-mounted display, computer monitor, television screen, mobile device screen, or other type of display device.

A data store (not shown) can store various settings for the panoramic video playback system (600). For example, the settings can include information provided by the application (680) when the application (680) is installed, Other modules can interact with the data store across an interface.

The view-dependent operation controller (610) is configured to receive an indication of a view direction (682) for the application (680). In FIG. 6, the application (680) provides the indication of the view direction (682). For example, the view direction (682) is specified as (1) a heading in degrees or radians from side to side (i.e., yaw, or pan) from a central view/camera position and (2) an inclination in degrees or radians up or down pitch, or tilt) from the view/camera position. The view direction (682) can also include (3) a rotation in degrees or radians of the view (i.e., roll) from the view/camera position. Alternatively, the view direction (682) can be parameterized in some other way (e.g., as a matrix of affine transform coefficients that specify a spatial rotation in three dimensions using Euler angles or quaternion units, which correspond to heading, pitch, and roll values). Instead of the application (680), another source (e.g., a source based on one or more sensors such as one or more accelerometers, gyroscopes, tilt sensors, optical sensors, cameras, etc., or a source of user input events for key presses, mouse cursor movements, mouse scroll wheel movements, remote control input, game controller input, touch screen input, etc.) can provide the indication of the view direction. In some configurations, the view-dependent operation controller (610) is also configured to receive an indication of a field of view (684) for the application (680), from the application (680) or another source. The field of view can be specified in degrees (e.g., 90 degrees for normal view, 120 degrees for wide view) or radians. The field of view (684) can be defined for the application (680) or for a playback session. Or, the field of view (684) can change dynamically (e.g., to zoom in or zoom out) during a playback session.

The view-dependent operation controller (610) is further configured to identify, based at least in part on the view direction (682), a section of the picture of panoramic video in an input projection. For example, the input projection is an equirectangular projection, and the identified section is a contiguous portion of the equirectangular projection or multiple non-contiguous portions that wrap around an edge of the equirectangular projection. Alternatively, the input projection can be a cubemap projection, and the identified section can be a contiguous portion of one or more faces of the cubemap projection or multiple non-contiguous portions that wrap around one or more edges of an "unfolded" cubemap projection.

To identify the section of the picture of panoramic video in the input projection, the view-dependent operation controller (610) can be configured to use the view direction (682) to identify a view section of a spherical projection, then determine one or more portions of the picture of panoramic video in the input projection that correspond to the view section in the spherical projection. For example, given a view section of the spherical projection, the view-dependent operation controller (610) can apply the inverse of the equirectangular-to-spherical projection to identify the corresponding portion(s) in the equirectangular projection. The corresponding portion(s) of the picture of panoramic video in the input projection can have an irregular boundary. To address this possibility, the view-dependent operation controller (610) can be further configured to define, tier the identified section, a bounding box around the corresponding portion(s) of the picture of panoramic video in the input projection. If the input projection includes multiple corresponding portions (e.g., across an edge), bounding boxes can be defined around the respective corresponding portions.

When the view-dependent operation controller (610) receives an indication of a field of view (684) for the application (680), the view-dependent operation controller (610) can use the field of view (684) when identifying the section of the picture of panoramic video in the input projection. Thus, the view-dependent operation controller (610) can be configured to use the view direction and the field of view to identify a view section of a spherical projection, then determine one or more portions of the picture of panoramic video in the input projection that correspond to the view section in the spherical projection. The view-dependent operation controller can define, for the identified section, a bounding box (or bounding boxes) including buffer area(s) around the corresponding portion(s) of the picture of panoramic video in the input projection.

The view-dependent operation controller (610) passes a control signal (612) to other modules of panoramic video playback system (600), which indicates the identified section of the picture of panoramic video in the input projection. For example, the control signal specifies the bounding box or bounding boxes for the identified section. In FIG. 6, the view-dependent operation controller (610) passes the control signal (612) to the color converter (660). In the scenario shown in FIG. 6, the view-dependent operation controller (610) is configured to limit operations of the color converter (660) to the identified section. In other scenarios (described below) the view-dependent operation controller (610) passes the control signal (612) to the streaming controller (620) and/or the video decoder (650), and operations of those modules are limited to the identified section. Alternatively, the view-dependent operation controller (610) can control operations of other modules of the panoramic video playback system (600) in some other way, so as to limit operations as described herein.

In FIG. 6, the view-dependent operation controller (610) is separate from the streaming controller (620), the video decoder (650), and the color converter (660). The view-dependent operation controller (610) sends a control signal (612) to the streaming controller (620), the video decoder (650), and/or the color converter (660), which indicates the identified section. Although shown separately in FIG. 6, the view-dependent operation controller (610) can be combined with the mapper (670) (i.e., part of the mapper (670)). The view-dependent operation controller (610) can also be part of the streaming controller (620), the video decoder (650), and/or the color converter (660).

The streaming controller (620) is configured to request encoded data for at least one section of a picture of panoramic video in an input projection (e.g., when so instructed by the view-dependent operation controller (610) or otherwise). The streaming controller (620) can request encoded data for all of a picture of panoramic video. Or, the streaming controller (620) can request encoded data for just an identified section of a picture of panoramic video. Depending on the scenario, the streaming controller (620) can send a request for encoded data to the media server (630) or a media store (631). In the scenario shown in FIG. 6, the playback controller (620) sends a request (622) for encoded data for all of a picture of panoramic video to the media server (630).

Thus, the streaming controller (620) can limit the regions (e.g., slices, tiles) of the picture of panoramic video in the input projection for which encoded data is requested. When the encoded data is partitioned for specific spatial regions, the streaming controller (620) can request encoded data for the regions that cover the bounding box(es) for the identified section, and not request encoded data for other sections of the picture of panoramic video in the input projection.

The media server (630) can be a Web server or other server, connected over a network, that stores encoded data for video and streams it to client systems for playback. The media server (630) can store encoded data for panoramic video. The encoded data can be partitioned into encoded data for different regions (e.g., slices, tiles) of a picture. In the scenario shown in FIG. 6, the media server (630) streams encoded data (632) for an entire picture of panoramic video to the panoramic video playback system (600). In other scenarios, the media server (630) may stream encoded data (632) for an identified section of a picture of panoramic video to the panoramic video playback system (600) (e.g., encoded data for spatial regions that cover the identified section).

If a media server (630) is not used, the panoramic video playback system (600) can retrieve encoded data from a media store (631). The media store (631) can be a magnetic disk, optical storage media, non-volatile memory, or other storage or memory, connected locally to the panoramic video playback system (600), that stores encoded data for panoramic video and provides it to the panoramic video playback system (600) for playback. The encoded data can be partitioned into encoded data for different regions (e.g., slices, tiles) of a picture. Depending on the scenario, the media store (631) may provide encoded data for all or only an identified section of a picture of panoramic video in an input projection.

The input buffer (640) is configured to store the encoded data. The input buffer (640) provides encoded data (e.g., encoded data (632) for all of a picture of panoramic video, or an identified section) to the video decoder (650), The video decoder is (650) configured to decode at least some of the encoded data, thereby producing sample values (652) of the at least one section of the picture of panoramic video in the input projection. Depending on implementation and the format of the encoded data, the video decoder (650) can decode the encoded data in a manner consistent with the H.265/HEVC standard, ISO/IEC 14496-10 standard (also known as H.264/AVC), another standard, or a proprietary format such as VP8 or VP9, or a variation or extension thereof. The sample values (652) of the picture of panoramic video in the input projection are, for example, 8-bit sample values or 10-bit sample values in a YUV color space, with a chroma sampling rate of 4:2:0. Alternatively, the sample values output by the video decoder (650) are in another format.

In some scenarios, the video decoder (650) limits decoding operations to the identified section of a picture of panoramic video in the input projection. In particular, the video decoder (650) limits decoding operations to the bounding box(es) of the identified section. The bounding box(es) may align with boundaries of spatial regions of encoded data (e.g., for tiles, for slices), or the bounding box(es) may fit within some set of regions of encoded data (e.g., for tiles, for slices).

In some cases, even when an identified section is provided for decoding, the video decoder (650) might still decode the entire picture if the picture will be used for reference in later decoding operations. The video decoder (650) can make this determination based on a syntax element in the bitstream (e.g., a "used for reference" flag for a picture). Or, the video decoder (650) can make this determination based on a rule (e.g., that B pictures are never used as reference pictures by an encoder or during a particular encoding session, but I pictures and P pictures may be used as reference pictures). Thus, the video decoder (650) can be configured to determine whether the picture of panoramic video in the input projection is used for reference during decoding of any subsequent picture of panoramic video in decoding order and, if so, decode encoded data for all of the picture of panoramic video in the input projection, producing sample values of all of the picture of panoramic video in the input projection. The video decoder (650) can also be configured to decode encoded data for only the identified section if the picture is not used for reference, producing sample values of only the identified section of the picture of panoramic video in the input projection. Alternatively, in addition to decoding any content within the bounding box(es), the video decoder (650) can decode regions (e.g., slices, tiles) of the picture that are indicated to be used for reference in later motion compensation (e.g., according to metadata, according to analysis of syntax elements of subsequent pictures).

The color converter (660) is configured to convert at least some of the sample values (652) produced by the video decoder from a first color space to a second color space. For example, the first color space is a YUV color space, and the second color space is an RGB color space. Before color space conversion or as part of color space conversion, the color converter (660) may perform chroma sample rate upsampling, to restore chroma sample values to have the same resolution as luma sample values in the decoded video.

The mapper (670) is configured to map at least some of the color-converted sample values (662) to an output projection. In platform rendering mode, to determine screen projection, the mapper (670) can perform operations as shown and described with reference to FIG. 4. In some example implementations, the mapper (670) can skip the intermediate, spherical projection and directly determine appropriate sample values of the screen projection from the sample values of the input projection. In application rendering mode, the mapper (670) can determine an output flat projection as described in the next section, using the color-converted sample values (662) for the identified section or sample values (652) from the video decoder (650).

The mapper (670) produces an output projection that includes sample values. (FIG. 6 shows the mapper (670) producing color-converted sample values (672) in an output projection.) For platform rendering mode, the output projection is a screen projection. For application rendering mode, the output projection is an output flat projection (e.g., equirectangular projection, cubemap projection). The output projection can be provided to the application (680) in various ways. For example, the output projection is provided in a buffer specified by the application (680).

In summary, for platform-rendering mode, the input projection can be an equirectangular projection or cubemap projection, and the output projection is a screen projection (686) for the application. The mapper (670) is configured to, for locations in the screen projection (686), determine corresponding locations in the input projection. The locations in the screen projection (686) and the corresponding locations in the input projection are associated with locations in a view section of an intermediate, spherical projection. The view section of the intermediate, spherical projection is indicated by the view direction (and field of view). The mapper (670) is further configured to assign sample values to the locations in the screen projection (686) based on the at least some of the color-converted sample values (662) at the corresponding locations in the input projection, respectively, and provide the screen projection (686) to the application (680). To assign sample values to the locations in the screen projection (686) without intermediate projection to a spherical projection, the mapper (670) can be configured to select sample values and/or interpolate (e.g., using bilinear interpolation) between sample values among the at least some of the color-converted sample values (662) at the corresponding locations in the input projection, respectively. Alternatively, in order to determine the corresponding locations and assign sample values, the mapper (670) can be configured to project the at least some of the color-converted sample values (662) from the input projection to the view section of the intermediate, spherical projection, and then project the at least some of the color-converted sample values from the view section of the intermediate, spherical projection to the screen projection (686). The application (680) provides the screen projection (686) to the display device (690).

For application rendering mode, the input projection is an input flat projection, and the output projection is an output flat projection. To produce the output flat projection, the mapper is configured to re-project at least some color-converted sample values (662) or sample values (652) in the input flat projection towards a center location for the view direction. The application (680) then maps the output projection to one or more screen projections (686), which are provided to the display device (690). Section VI details operations that can be performed for re-projection between flat projections in application rendering mode.

In the scenario shown in FIG. 6, the view-dependent operation controller (610) is configured to limit operations of the color converter (660) to the identified section. In this scenario, the view-dependent operation controller (610) is not configured to limit operations of the streaming controller (620) or the video decoder (650) to the identified section. Thus, in this scenario, the streaming controller (620) is configured to request encoded data for the entire picture of panoramic video in the input projection. The video decoder (650) is configured to decode encoded data for the entire picture of panoramic video in the input projection, producing sample values of all of the picture of panoramic video in the input projection. The color converter (660) is configured to convert sample values from the first color space to the second color space for only the identified section, however, and not other sections of the picture.

In another scenario, in addition to limiting operations of the color converter (660), the view-dependent operation controller (610) is configured to limit operations of the video decoder (650) (but not the streaming controller (620)) to the identified section. In this scenario, the streaming controller (620) is configured to request encoded data for the entire picture of panoramic video in the input projection. The video decoder (650) is configured to selectively decode encoded data for only the identified section in the input projection (and not other sections in the input projection). The color converter (660) is configured to convert sample values from the first color space to the second color space for only the identified section (and not other sections in the input projection).

In still another scenario, in addition to limiting operations of the color converter (660), the view-dependent operation controller (610) is configured to limit operations of the video decoder (650) and the streaming controller (620) to the identified section. In this scenario, the streaming controller (620) is configured to request encoded data for only the identified section (and not other sections of the input projection). The video decoder (650) is configured to selectively decode encoded data for only the identified section (and not other sections of the input projection). The color converter (660) is configured to convert sample values from the first color space to the second color space for only the identified section (and not other sections of the input projection).

The panoramic video playback system (600) can also selectively remove any limitations on operations of the streaming controller (620), video decoder (650), and color converter (660). For example, if playback of panoramic video is paused, the streaming controller (620) can request encoded data for an entire input projection (or the rest of a partially decoded input projection), the video decoder (650) can decode the entire input projection (or the rest of a partially decoded input projection), and the color converter (660) can perform color conversion operations for the entire input projection (or the rest of the partially reconstructed input projection). In this way, the entire input projection is available for rendering should the viewer choose to navigate through the "paused" environment of the panoramic video.

Depending on implementation and the type of processing desired, modules of the panoramic video playback system (600) can be added, omitted, split into multiple modules, combined with other modules, and/or replaced with like modules. In alternative embodiments, video playback systems with different modules and/or other configurations of modules perform one or more of the described techniques. Specific embodiments of panoramic video playback systems typically use a variation or supplemented version of the panoramic video playback system (600). The relationships shown between modules within the panoramic video playback system (600) indicate general flows of information in the panoramic video playback system (600); other relationships are not shown for the sake of simplicity. In general, a given module of the panoramic video playback system (600) can be implemented by software executable on a CPU, by software controlling special-purpose hardware (e.g., a GPU or other graphics hardware for video acceleration), or by special-purpose hardware (e.g., in an ASIC). In particular, in some example implementations, color conversion operations eluding view-dependent operations limited to an identified section of a picture of panoramic video in an input projection) are implemented with shader instructions executable on a GPU, and re-projection operations are implemented with shader instructions executable on a GPU.

B. Example Operations in Scenarios for Limiting Color Conversion.

Figure 7:
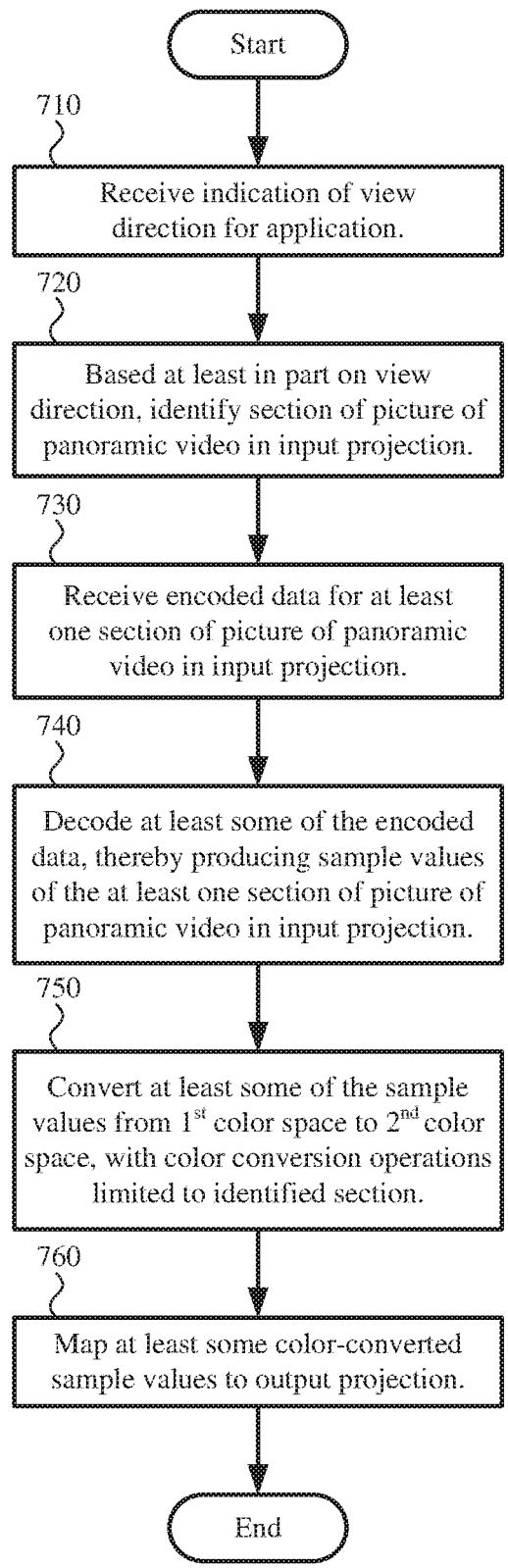
FIG. 7 is a flowchart illustrating a generalized technique for playback of panoramic video with view-dependent operations.

FIG. 7 shows a generalized technique (700) for playback of panoramic video with view-dependent operations. A panoramic video playback system such as the panoramic video playback system (600) shown in FIG. 6 or other panoramic video playback system performs the technique (700).

The panoramic video playback system receives 710) an indication of a view direction for an application. For example, the indication of the view direction is a set of heading, pitch, and roll values for the view direction. Or, the indication of the view direction is a set of affine transform coefficients that specify a spatial rotation for the view direction. Or, the view direction is specified in some other way. The panoramic video playback system can receive the indication of the view direction from the application or from a source specified by the application. The panoramic video playback system can also receive an indication of a field of view for the application.

Based at least in part on the view direction, the panoramic video playback system identifies (720) a section of a picture of panoramic video in an input projection. For example, the input projection is an equirectangular projection or a cubemap projection.

The panoramic video playback system receives (730) encoded data for at least one section of the picture of panoramic video in the input projection and decodes (740) at least some of the encoded data. This produces sample values of the at least one section of the picture of panoramic video in the input projection. As explained above, in other scenarios, operations of the decoding (740) can be limited to the identified section. In still other scenarios, the panoramic video playback system further limits the encoded data that is requested (and hence received) to be the encoded data for the identified section.

The panoramic video playback system converts (750) at least some of the sample values from a first color space to a second color space. Operations of the converting (that is, color conversion operations) are limited to the identified section.

The panoramic video playback system maps (760) at least some of the color-converted sample values to an output projection. For example, the output projection is a screen projection (for platform rendering mode) or output flat projection such as an output equirectangular projection or cubemap projection (for application rendering mode).

The panoramic video playback system can repeat the technique (700) shown in FIG. 7 on a picture-by-picture basis.

VI. Example Re-Projection Operations for Application Rendering Mode.

In application rendering mode, a system-provided module of a panoramic video playback system (that is, part of a "platform") provides a flat projection for a picture of panoramic video to an application. The flat projection can be an equirectangular projection or cubemap projection. The application includes a mapper that performs additional transformations to sample values of the flat projection (e.g., mapping to spherical projection, mapping to screen projection), so as to generate one or more screen projections appropriate for the application. For example, the application is a virtual reality application, augmented reality application, or specialty media application for panoramic video.

Typically, the application could (at least in theory) generate screen projections from full-frame flat projections as input. That is, the application can accept an input flat projection for an entire picture. For the application to be able operate on less powerful hardware, however, the platform can provide a re-projected version of the input flat projection in which irrelevant details are cropped away. Or, the re-projected version of the flat projection can have the same size as the original flat projection, but include additional sample values for better resolution of relevant parts. Thus, in some example implementations, re-projection can improve application performance because the new flat projection that the application receives (1) can be smaller (due to cropping); and/or (2) can include more sample values for relevant parts of the picture, which can make screen projection by the application more accurate. Also, relevant parts of the picture are centered in the new flat projection, which can simplify implementation for the application. The new flat projection can also have the same size from picture to picture, which can further simplify implementation for the application. Finally, re-projection can simplify integration with view-dependent operations, if view-dependent operations are used in application rendering mode.

A. Examples of Re-Projection Between Flat Projections.

Figure 8:
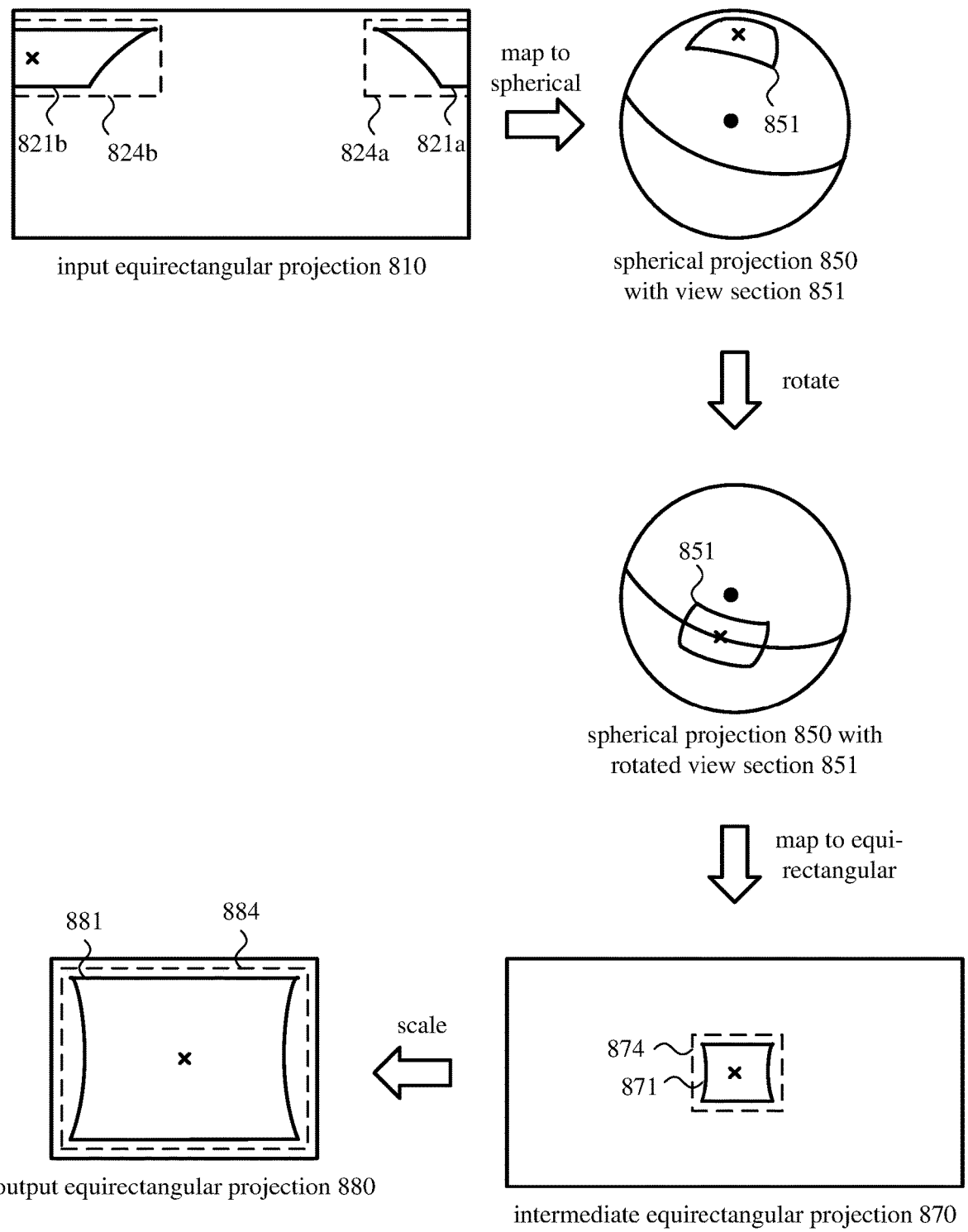
FIG. 8 is a diagram illustrating concepts of re-projection of sample values of an input flat projection to an output flat projection for a picture of panoramic video in application rendering mode.

FIG. 8 illustrates concepts of re-projection of sample values of an input flat projection to an output flat projection for a picture of panoramic video in application rendering mode. In the example of FIG. 8, for a view section of a spherical projection for a picture of panoramic video, a corresponding section has been identified in an input equirectangular projection (810). In input equirectangular project (810), the identified section includes bounding boxes (824a, 824b) around corresponding portions (821a, 821b). An x indicates the center of the view direction for the identified section in the input equirectangular projection (810).

The input equirectangular projection (810) is mapped to a spherical projection (850), which includes the view section (851) corresponding to the identified section of the input equirectangular projection (810). For the center location (x), coordinates (e.g., Cartesian x, y, z coordinates or polar coordinates) are found in the spherical projection (850).

In FIG. 8, the view section (851) is located towards the top of the spherical projection (850), which is consistent with the extensive horizontal stretching shown for the corresponding portions (821a, 821b) in the input equirectangular projection (810). As a result of the horizontal stretching, the identified section in the input equirectangular projection (810) includes a relatively large number of sample values. Also, the identified section is split into two bounding boxes.

The spherical projection (850) is rotated so that the center location (x) for the view direction will correspond to a center location of an output flat projection. That is, the spherical projection is rotated so that the center location (x) is rotated to new Cartesian X', y', z' coordinates at a default location such as (0, 0, 0) in the spherical projection (850), or rotated to new polar coordinates ($\varphi$, $\theta$) at a default location such as heading of 0 degees and pitch of 0 degrees in the spherical projection (850).

After rotation, the spherical projection (850) is mapped to an intermediate equirectangular projection (870) for the entire picture. In the intermediate equirectangular projection (870), the identified section is centered. That is, the center location (x) for the view direction is at the middle of the intermediate equirectangular projection (870). The identified section includes a bounding box (874) around the corresponding portion (871) for the view section (851) after rotation. At this point, the intermediate equirectangular projection (870) could be provided to the application for rendering of one or more screen projections.

Compared to the identified section in the input equirectangular projection (810), the identified section in the intermediate equirectangular projection (870) includes fewer sample values. Also, the sample values are enclosed in a single bounding box. This reduces resource requirements for the application if the identified section of the intermediate equirectangular projection (870) (e.g., after cropping) is provided to the application.

Optionally, the intermediate equirectangular projection (870) may be scaled (as shown in FIG. 8) and/or cropped (not shown in FIG. 8) to yield an output equirectangular projection (880), which may be provided to the application. In the output equirectangular projection (880), the identified section includes a bounding box (884) around the scaled corresponding portion (881) for the view section (851).

Compared to the identified section in the intermediate equirectangular projection (870), the identified section in the output equirectangular projection (880) includes more sample values. Although this may increase resource requirements for the application if the output equirectangular projection (880) is provided to the application, the application is provided with more sample values for rendering.

Thus, after re-projection, the view direction is the center of the equirectangular projection. So long as the field of view does not change, the size of the bounding rectangle may be unchanged. Or, with scaling, the size of the bounding rectangle can remain the same even if the field of view changes due to zooming in or zooming out.

Figure 9A:
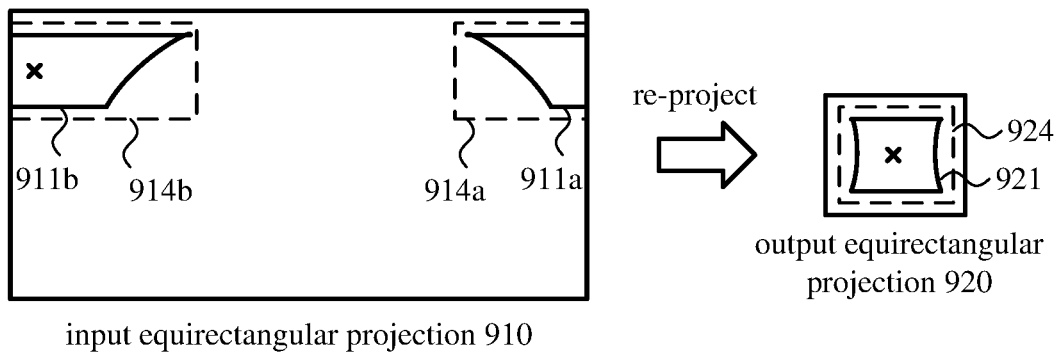
FIGS. 9a and 9b are diagrams illustrating examples of re-projection of sample values of an input flat projection to an output flat projection for a picture of panoramic video in application rendering mode.
Figure 9B:
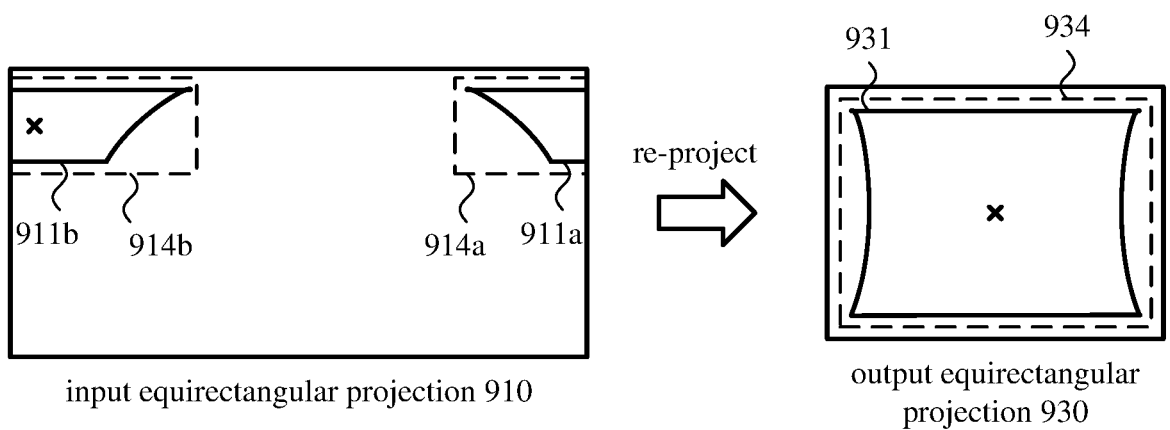

In practice, intermediate mapping to the spherical projection and rotation can be skipped. For example, for locations of the output flat projection, a mapper determines corresponding locations in an input flat projection, and assigns sample values (by copying or interpolation) from the respective locations in the input flat projection. FIGS. 9*a* and 9*b* show examples of re-projection of sample values of an input flat projection to an output flat projection for a picture of panoramic video in application rendering mode, without intermediate mapping to a spherical projection.

In FIG. 9*a*, for a view section in a view direction, the input equirectangular projection (910) includes an identified section with corresponding portions (911*a*, 911*b*) surrounded by bounding boxes (914*a*, 914*b*). The center location (x) for the view direction is shown. Without intermediate mapping to a spherical projection or rotation of a spherical projection, certain sample values of the input equirectangular projection (910) are re-projected to an output equirectangular projection (920). In the output equirectangular projection (920), the identified section includes a corresponding portion (921) surrounded by a bounding box (924). For example, for the respective locations in the bounding box (924) in the output equirectangular projection (920), corresponding locations in the identified section in the input equirectangular projection (910) are determined, and sample values from the corresponding locations are assigned (e.g., by retrieving the sample values or by interpolation). Compared to the identified section in the input equirectangular projection (910), the identified section in the output equirectangular projection (920) includes fewer sample values and has a single bounding box. Thus, re-projection can reduce resource requirements for the application if the identified section of the output equirectangular projection (920) is provided to the application.

In FIG. 9*b*, as in FIG. 9*a*, for a view section in a view direction, the input equirectangular projection (910) includes an identified section with corresponding portions (911*a*, 911*b*) surrounded by bounding boxes (914*a*, 914*b*), The center location (x) for the view direction is shown. Without intermediate mapping to a spherical projection or rotation of a spherical projection, certain sample values of the input equirectangular projection (910) are re-projected to an output equirectangular projection (930) and scaled. In the output equirectangular projection (930), the identified section includes a scaled corresponding portion (931) surrounded by a bounding box (934). For example, for the respective locations in the bounding box (934) in the output equirectangular projection (930), corresponding locations in the identified section in the input equirectangular projection (910) are determined, and sample values from the corresponding locations are assigned (e.g., by retrieving the sample values or by interpolation).

B. Example Re-Projection Architectures.

FIG. 10 shows features of an example architecture for a panoramic video playback system that operates in application rendering mode. The example architecture can be a variation of the architecture described with reference to FIG. 6, which supports view-dependent operations. Alternatively, the example architecture of FIG. 10 can be used in a system without support for view-dependent operations.

In FIG. 10, a panoramic video playback system (1000) includes a mapper (1070). The mapper (1070) is a system-provided module. That is, the mapper (1070) is part of a platform that supports application rendering of panoramic video. The mapper (1070) is configured to map at least some sample values (e.g., color-converted sample values provided by a color converter, or sample values provided by a decoder) to sample values (1072) of an output flat projection. In particular, the mapper (1070) is configured to re-project sample values in an input flat projection towards a center location for a view direction (1082) for the application (1080). The mapper (1070) can accept, as input, the view direction (1082) for the application (1080).

For example, for locations in the output flat projection, the mapper (1070) is configured to determine corresponding locations in the input flat projection. The locations in the output flat projection and the corresponding locations in the input flat projection are associated with locations in a view section of an intermediate, spherical projection. The view section of the intermediate, spherical projection is indicated by the view direction (1082). The mapper (1070) is configured to assign sample values to the locations in the output flat projection based on sample values at the corresponding locations in the input flat projection, respectively, and provide the output flat projection to the application (1080). To assign sample values to the locations in the output flat projection without mapping to the intermediate, spherical projection, the mapper (1070) can be configured to select sample values and/or interpolate (e.g., using bilinear interpolation) between sample values at the corresponding locations in the input flat projection, respectively. Alternatively, in order to determine the corresponding locations and assign sample values, the mapper can be configured to project sample values in the input flat projection to the view section of the intermediate, spherical projection, and then project the sample values from the view section of the intermediate, spherical projection to the output flat projection. The identified section can scaled to produce the output flat projection.

The panoramic video playback system can include a color converter, which is configured to convert sample values, produced by the video decoder, from a first color space to a second color space. In this case, the mapper (1070) is configured to map color-converted sample values to the output flat projection. For locations in the output flat projection, the mapper (1070) can be configured to determine corresponding locations in the input flat projection. The locations in the output flat projection and the corresponding locations in the input flat projection are associated with locations in a view section of an intermediate, spherical projection. The view section of the intermediate, spherical projection is indicated by the view direction (1082). The mapper (1070) is further configured to assign sample values to the locations in the output flat projection based on the color-converted sample values at the corresponding locations in the input flat projection, respectively, and provide the output flat projection to the application (1080). To assign sample values to the locations in the output flat projection without mapping to the intermediate, spherical projection, the mapper (1070) can be configured to select color-converted sample values and/or interpolate between color-converted sample values at the corresponding locations in the input flat projection. Alternatively, in order to determine the corresponding locations and assign sample values, the mapper can be configured to project color-converted sample values from the input flat projection to the view section of the intermediate, spherical projection, and then project the color-converted sample values from the view section of the intermediate, spherical projection to the output flat projection.

The mapper (1070) can be configured to identify, depending on the view direction (1082) for the application (1080), a section in the input flat projection. The mapper (1070) can also accept, as input, the field of view (1084) for the application (1080). In this case, the mapper (1070) can be configured to identify, depending on the view direction (1082) and the field of view (1084) for the application (1080), a section in the input flat projection. The identified section in the input flat projection can be a contiguous portion of the input flat projection or multiple non-contiguous portions that wrap around an edge of the input flat projection.

In some example implementations, the mapper (1070) is configured to re-project sample values in the input flat projection so that the output flat projection is exactly centered at the center location for the view direction. Alternatively, the output flat projection can be approximately centered at the center location for the view direction. The input flat projection and the output flat projection can have the same size. Or, the input flat projection and the output flat projection can have different sizes. In particular, the mapper (1070) can be configured to scale a section of the input flat projection to fill the output flat projection, or at least substantially fill the output flat projection, with a buffer area filling remaining boundary areas. Thus, the output flat projection can correspond to one section of the input flat projection, and portions of the input flat projection outside the section can be cropped away in the output flat projection.

With reference to FIG. 10, the panoramic video playback system (1000) further includes the application (1080), which may be provided by a third party. The application (1080) includes a second mapper (1088), which is configured to map at least some of the sample values (1072) from the output flat projection to a screen projection (1086), which is rendered for display on a display device (1090).

Other components of the panoramic video playback system (1000) can include a streaming controller, input buffer, and video decoder, which operate as described with reference to FIG. 6. In some example implementations, the panoramic video playback system (1000) also includes a view-dependent operation controller, which operates as described with reference to FIG. 6.

C. Example Operations for Re-Projecting Between Flat Projections.

Figure 11:
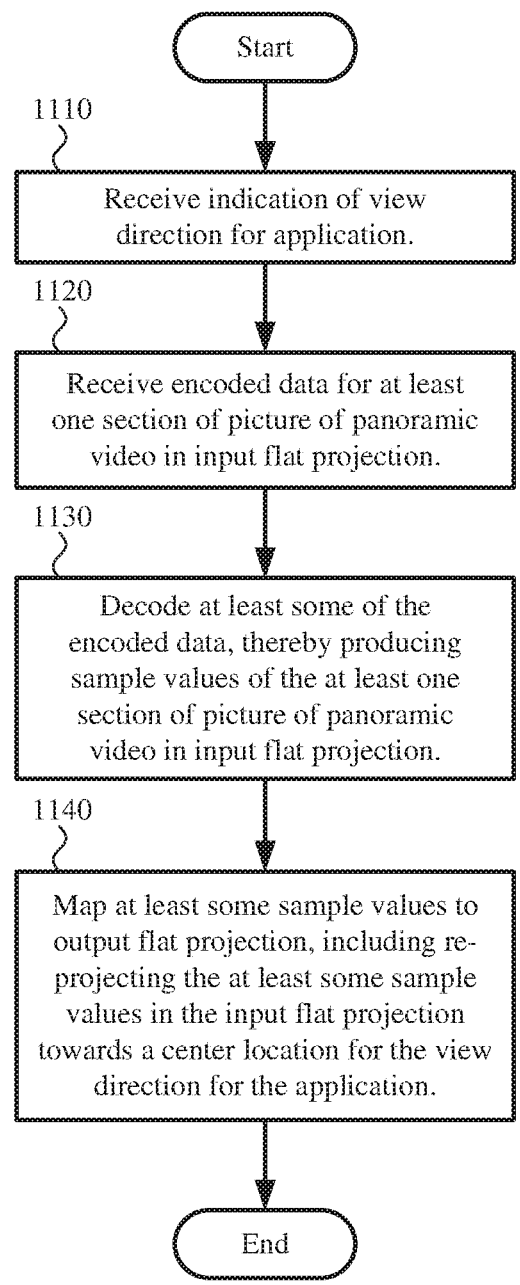
FIG. 11 is a flowchart illustrating a generalized technique for re-projection of sample values of an input flat projection to an output flat projection in application rendering mode during playback of a picture of panoramic video.

FIG. 11 shows a generalized technique (1100) for re-projection of sample values of an input flat projection to an output flat projection in application rendering mode during playback of a picture of panoramic video. A panoramic video playback system such as the panoramic video playback system (1000) shown in FIG. 10 or other panoramic video playback system performs the technique (1100).

The panoramic video playback system receives (1110) an indication of a view direction for an application. The indication of the view direction can be received as described with reference to FIG. 6 or received in some other way.

The panoramic video playback system receives (1120) encoded data for at least one section of a picture of panoramic video in an input flat projection. For example, the input flat projection can be an input equirectangular projection or input cubemap projection. The encoded data can be received as described with reference to FIG. 6 or received in some other way.

The panoramic video playback system decodes (1130) at least some of the encoded data. This produces sample values of the at least one section of the picture of panoramic video in the input flat projection. The encoded data can be decoded as described with reference to FIG. 6 or decoded in some other way.

The panoramic video playback system maps (1140) at least some of the sample values from the input flat projection to an output flat projection. For example, the output flat projection can be output equirectangular projection or an output cubemap projection. As part of the mapping, the panoramic video playback system re-projects sample values of the input flat projection towards a center location for the view direction for the application. Sample values of the input flat projection can be re-projected to the output flat projection as described with reference to FIGS. 9a, 9b and 12, as described with reference to FIG. 8, or in some other way.

The panoramic video playback system can repeat the technique (1100) shown in FIG. 11 on a picture-by-picture basis.

D. Example Implementations for Re-Projecting Between Equirectangular Projections.

In some example implementations, to re-project relevant parts of an input equirectangular projection to an output equirectangular projection, for each location in the output equirectangular projection, a corresponding location in the input equirectangular projection is identified. A sample value is then assigned to the location in the output equirectangular projection based on the sample value at the corresponding location in the input equirectangular projection or interpolation between sample values at neighboring locations in the input equirectangular projection.

FIG. 12 shows an output equirectangular projection (1210), which has a width of $w_o$ sample values and a height of $h_o$ sample values. A point of the output equirectangular projection (1210) is labeled $u_o$, $v_o$. For the sake of illustration, the point $u_o$, $v_o$ in the output equirectangular projection (1210) is the center point of the view direction, but re-projection operations are similarly performed for other locations in the output equirectangular projection (1210).

The width $w_0$ depends on the field of view (FOV), which is measured in radians. For example, the width $w_0$ is set to be:

$$w_O = \frac{\sin(FOV/2)/\cos(FOV/2)}{2}.$$

For the example shown in FIG. 12, the height $h_0$ depends on the width $w_0$. For example, the height $h_0$ is set to be: $h_0 = w_0/\pi$.

FIG. 12 also shows an input equirectangular projection (1290), which has a width of $w_1$ sample values and a height of $h_1$ sample values. The dimensions $w_1$ and $h_1$ of the input equirectangular projection (1290) can be 2160×1080 sample values, 4320×2160 sample values, 7680×3840 sample values, 8640×4320 sample values, or some other number of sample values per picture. The input equirectangular projection includes a location labeled $u_1, v_1$, which corresponds the labeled location $u_0, v_0$ of the output equirectangular projection (1210). For the sake of illustration, the location $u_1, v_1$ in the input equirectangular projection (1290) is the center location of the view direction, but re-projection operations are similarly performed to determine corresponding locations in the input equirectangular projection (1290) for other locations of the output equirectangular projection (1210).

For the location $u_0, v_0$ in the output equirectangular projection (1210), a mapper re-normalizes the location. The location $u_0, v_0$ is initially a relative value in equirectangular coordinates, with each component in the range of 0 . . . 10. The vector $\vec{P}_0$ represents the location after re-normalization, and is computed as:

$$\vec{P}_0 = 2 \times (<u_0, v_0> - 0.5) \cdot w_0, h_0>,$$

where · indicates element-wise multiplication, the subtraction of 0.5 is performed for each element, and the multiplication by a factor of 2 is performed for each element.

Next, the re-normalized location $\vec{P}_0$ is converted to spherical coordinates. The vector $\vec{S}_0$ represents the location after conversion to spherical coordinates, and is computed as:

$$\vec{S}_O = \pi \times \frac{\vec{P}_O + 1}{2} + <0, \frac{\pi}{2}>,$$

where the multiplication by a factor of $\pi$ is performed for each element, and the addition of $<0, \pi/2>$ is performed element-wise. At this point, the location $\vec{P}_0$ in re-normalized equirectangular coordinates is represented as the location $\vec{S}_0$ in spherical coordinates $<r, \varphi_0, \theta_0>$, where r is understood to be 1 and is omitted from many later calculations.

Next, the location $\vec{S}_0$ in spherical coordinates is converted to Cartesian coordinates. The vector $\vec{C}_0$ represents the location after conversion to Cartesian coordinates, and is computed as:

$$\vec{C}_0 = \text{sph2cart}(\vec{S}_0) \cdot <1, 1, -1, 1>,$$

where · indicates element-wise multiplication, and the function sph2cart( ) is defined as:

$$\text{sph2cart}(<\varphi_0, \theta_0>) = <\cos(\varphi_0) \times \sin(\theta_0),$$

$$\cos(\theta_0),$$

$$\sin(\varphi_0) \times \sin(\theta_0),$$

$$1>.$$

At this point, the location $\vec{S}_0$ in spherical coordinates $<r, \varphi_0, \theta_0>$ is represented as the location $\vec{C}_0$ in Cartesian coordinates $<x_0, y_0, z_0, w_0>$ where $x_0 = \cos(\varphi_0) \times \sin(\theta_0)$, $y_0 = \cos(\theta_0)$, $z_0 \sin(\varphi_0) \times \sin(\theta_0)$, and $w_0 = 1$.

Next, the location $\vec{C}_0$ in Cartesian coordinates is rotated depending on the view direction. The matrix $M_L$ is a 4×4 affine matrix for a view direction, which can specify a spatial rotation in three dimensions using Euler angles or quaternion units. The matrix $M_L$ can be calculated for a view direction (e.g., from heading, pitch, and roll values) specified for an application. The rotation of the location $\vec{C}_0$ yields a rotated location $\vec{C}_1$ in Cartesian coordinates:

$$\vec{C}_1 = \vec{C}_1 \cdot M_L^{-1},$$

where · indicates a matrix multiplication. At this point, the rotated location $\vec{C}_1$ in Cartesian coordinates includes components $<x_1, y_1, z_1, w_1>$, where $<x_1, y_1, z_1> = L^{-1} <x_0, y_0, z_0>$, and $w_1$ is still 1.

Next, the rotated location $\vec{C}_1$ in Cartesian coordinates is converted back to spherical coordinates. The vector $\vec{S}_1$ represents the location after conversion back to spherical coordinates, and is computed as:

$$\vec{S}_1 = \text{cart2sph}(\vec{C}_1),$$

where the function cart2sph( ) is defined as:

$$\text{cart2sph}(<x_1, y_1, z_1, w_1>) = <\sqrt{x_1^2 + y_1^2 + z_1^2},$$

$$\cos^{-1}(y/\sqrt{x_1^2 + y_1^2 + z_1^2}),$$

$$\tan^{-1}(z_1/x_1)>.$$

Thus, the location $\vec{C}_1$ in Cartesian coordinates is represented as the location $\vec{S}_1$ in spherical coordinates $<r, \varphi_1, \theta_1>$, where $r = \sqrt{x_1^2 + y_1^2 + z_1^2}$, $\varphi_1 = \cos^{-1}(y/\sqrt{x_1^2 + y_1^2 + z_1^2})$, and $\theta_1 = \tan^{-1}(z_1/x_1)$.

Finally, the location $\vec{S}_1$ in spherical coordinates $<r, \varphi_1, \theta_1>$ is converted back to equirectangular coordinates for the location $u_1, v_1$ in the input equirectangular projection (1290), as follows:

$$u_1 = 1 - \varphi_1/2\pi, \text{ and}$$

$$v_1 = \theta_1/\pi.$$

A sample value is then assigned to the location $u_0, v_0$ in the output equirectangular projection (1210) based on the sample value at the corresponding location $v_1$ in the input equirectangular projection (1290). Or, if the corresponding location $u_1, v_1$ in the input equirectangular projection (1290) is at a fractional position, a sample value is interpolated between locations that neighbor the corresponding location $u_1, v_1$ in the input equirectangular projection (1290) (e.g., using bilinear interpolation between the four closest sample values) and assigned to the location $u_0, v_0$ in the output equirectangular projection (1210).

Corresponding locations in the input equirectangular projection (1290) can be calculated, and sample values assigned (by retrieving sample values from corresponding locations or interpolation), in parallel for different locations in the output equirectangular projection (1210). For example, such calculations can be implemented with shader instructions in a GPU.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, wherein the computer system implements a panoramic video playback system that includes:
    a view-dependent operation controller configured to:
        receive an indication of a view direction for an application;
        based at least in part on the view direction, identify a section of a picture of panoramic video in an input flat projection, the picture of panoramic video in the input flat projection being based on sample values of different camera views recorded at a given time in multiple directions around a central position, wherein the identified section includes a portion of the picture of panoramic video in the input flat projection; and
        define a bounding box, for the identified section, around the portion of the picture of panoramic video in the input flat projection, the bounding box including a buffer area outside the portion of the picture of panoramic video in the input flat projection;
    a streaming controller configured to request encoded data for one or more spatial regions, wherein the bounding box aligns with boundaries of the one or more spatial regions or fits within the one or more spatial regions, and wherein the one or more spatial regions are slices or tiles;
    an input buffer configured to store the encoded data;
    a video decoder configured to decode at least some of the encoded data, thereby producing sample values of the identified section, the sample values of the identified section including sample values of the portion of the picture of panoramic video in the input flat projection and sample values of the buffer area; and
    a mapper configured to map at least some of the sample values of the identified section in the input flat projection to an output flat projection, wherein the mapper is configured to re-project the at least some of the sample values of the identified section in the input flat projection towards a center location for the view direction.

2. The computer system of claim 1, wherein the view direction is a current view direction or a predicted view direction.

3. The computer system of claim 1, wherein the mapper is configured to:
    for locations in the output flat projection, determine corresponding locations in the input flat projection, wherein the locations in the output flat projection and the corresponding locations in the input flat projection are associated with locations in a view section of an intermediate, spherical projection, the view section of the intermediate, spherical projection being indicated by the view direction;
    assign sample values to the locations in the output flat projection based on the at least some of the sample values of the identified section in the input flat projection at the corresponding locations in the input flat projection, respectively; and
    provide the output flat projection to the application.

4. The computer system of claim 1, wherein the mapper is configured to, when the view direction changes rapidly, use at least some of the sample values of the buffer area in the re-projection.

5. The computer system of claim 1, wherein the decoder is configured to, when the view direction changes gradually, use at least some of the sample values of the buffer area for reference in later decoding operations.

6. The computer system of claim 1, wherein the mapper is configured to re-project the at least some of the sample values of the identified section in the input flat projection so that the output flat projection is centered at the center location for the view direction.

7. The computer system of claim 1, wherein the mapper is configured to scale the identified section of the input flat projection to substantially fill the output flat projection.

8. The computer system of claim 1, wherein the panoramic video playback system further includes the application, and wherein the application includes:
    a second mapper configured to map at least some sample values from the output flat projection to a screen projection.

9. In a computer system, a method comprising:
    receiving an indication of a view direction for an application;
    based at least in part on the view direction, identifying a section of a picture of panoramic video in an input flat projection, the picture of panoramic video in the input flat projection being based on sample values of different camera views recorded at a given time in multiple directions around a central position, wherein the identified section includes a portion of the picture of panoramic video in the input flat projection;
    defining a bounding box, for the identified section, around the portion of the picture of panoramic video in the input flat projection, the bounding box including a buffer area outside the portion of the picture of panoramic video in the input flat projection;
    receiving encoded data for one or more spatial regions, wherein the bounding box aligns with boundaries of the one or more spatial regions or fits within the one or more spatial regions, and wherein the one or more spatial regions are slices or tiles;
    decoding at least some of the encoded data, thereby producing sample values of the identified section, the sample values of the identified section including sample values of the portion of the picture of panoramic video in the input flat projection and sample values of the buffer area; and
    mapping at least some of the sample values of the identified section in the input flat projection to an output flat projection, including re-projecting the at least some of the sample values of the identified section in the input flat projection towards a center location for the view direction.

10. The method of claim 9, wherein the view direction is a current view direction or a predicted view direction.

11. The method of claim 9, wherein the mapping further includes, when the view direction changes rapidly, using at least some of the sample values of the buffer area in the re-projecting.

12. The method of claim 9, further comprising, when the view direction changes gradually, using at least some of the sample values of the buffer area for reference in later decoding operations.

13. The method of claim 9, wherein the mapping includes scaling the identified section of the input flat projection to substantially fill the output flat projection.

14. The method of claim 9, further comprising:
with the application, mapping at least some sample values from the output flat projection to a screen projection.

15. One or more computer-readable media storing computer-executable instructions for causing a computer system, when programmed thereby, to perform operations comprising:
receiving an indication of a view direction for an application;
based at least in part on the view direction, identifying a section of a picture of panoramic video in an input flat projection, the picture of panoramic video in the input flat projection being based on sample values of different camera views recorded at a given time in multiple directions around a central position, wherein the identified section includes a portion of the picture of panoramic video in the input flat projection;
defining a bounding box, for the identified section, around the portion of the picture of panoramic video in the input flat projection, the bounding box including a buffer area outside the portion of the picture of panoramic video in the input flat projection;
receiving encoded data for one or more spatial regions, wherein the bounding box aligns with boundaries of the one or more spatial regions or fits within the one or more spatial regions, and wherein the one or more spatial regions are slices or tiles;
decoding at least some of the encoded data, thereby producing sample values of the identified section, the sample values of the identified section including sample values of the portion of the picture of panoramic video in the input flat projection and sample values of the buffer area; and
mapping at least some of the sample values of the identified section in the input flat projection to an output flat projection, including re-projecting the at least some of the sample values of the identified section in the input flat projection towards a center location for the view direction.

16. The one or more computer-readable media of claim 15, wherein the mapping includes:
for locations in the output flat projection, determining corresponding locations in the input flat projection, wherein the locations in the output flat projection and the corresponding locations in the input flat projection are associated with locations in a view section of an intermediate, spherical projection, the view section of the intermediate, spherical projection being indicated by the view direction; and
assigning sample values to the locations in the output flat projection based on the at least some of the sample values of the identified section in the input flat projection at the corresponding locations in the input flat projection, respectively.

17. The one or more computer-readable media of claim 15, wherein the mapping further includes, when the view direction changes rapidly, using at least some of the sample values of the buffer area in the re-projecting.

18. The one or more computer-readable media of claim 15, wherein the operations further comprise, when the view direction changes gradually, using at least some of the sample values of the buffer area for reference in later decoding operations.

19. The one or more computer-readable media of claim 15, wherein the mapping includes scaling the identified section of the input flat projection to substantially fill the output flat projection and cropping portions of the bounding box outside the identified section.

20. The one or more computer-readable media of claim 15, wherein the operations further comprise:
with the application, mapping at least some sample values from the output flat projection to a screen projection.

* * * * *